US009021672B2

(12) United States Patent
Brown

(10) Patent No.: US 9,021,672 B2
(45) Date of Patent: May 5, 2015

(54) FASTENER AND MATERIAL REMOVER

(71) Applicant: Jeff David Brown, Lindale, TX (US)

(72) Inventor: Jeff David Brown, Lindale, TX (US)

( * ) Notice: Subject to any disclaimer, the term of this patent is extended or adjusted under 35 U.S.C. 154(b) by 289 days.

(21) Appl. No.: 13/773,899

(22) Filed: Feb. 22, 2013

(65) Prior Publication Data

US 2013/0219706 A1  Aug. 29, 2013

Related U.S. Application Data

(60) Provisional application No. 61/634,055, filed on Feb. 23, 2012.

(51) Int. Cl.
*B25B 27/14* (2006.01)
*B23P 19/04* (2006.01)
*B25D 11/10* (2006.01)
*B25D 17/02* (2006.01)

(52) U.S. Cl.
CPC .................. *B23P 19/04* (2013.01); *Y10T 29/53* (2015.01); *B25D 2217/0096* (2013.01); *B25D 11/104* (2013.01); *B25D 11/108* (2013.01); *B25D 17/02* (2013.01); *B25D 2250/275* (2013.01); *B25D 2217/0061* (2013.01)

(58) Field of Classification Search
USPC ............ 29/253, 244, 270, 278, 238, 237, 252
See application file for complete search history.

(56) References Cited

U.S. PATENT DOCUMENTS

| | | | | |
|---|---|---|---|---|
| 6,508,151 B1* | 1/2003 | Neitzell | ............................ | 83/34 |
| 8,407,901 B2* | 4/2013 | Oberheim | ........................ | 30/393 |
| 8,621,967 B2* | 1/2014 | Doumani | .......................... | 83/13 |
| 2005/0092156 A1* | 5/2005 | Michel et al. | ............... | 83/698.11 |
| 2007/0000354 A1* | 1/2007 | Tyler | ................................ | 81/45 |
| 2009/0188350 A1* | 7/2009 | Becoat | .............................. | 81/45 |
| 2013/0219706 A1* | 8/2013 | Brown | ............................ | 29/700 |

* cited by examiner

*Primary Examiner* — Lee D Wilson
(74) *Attorney, Agent, or Firm* — Norred Law, PLLC; Warren V. Norred

(57) ABSTRACT

An apparatus for removal of fasteners. The apparatus comprises a motor, a rotary drive shaft, a striker mechanism operable to convert rotary motion into reciprocating linear motion and a reciprocating shear blade shaped and sized to shear off fasteners or split materials.

14 Claims, 4 Drawing Sheets

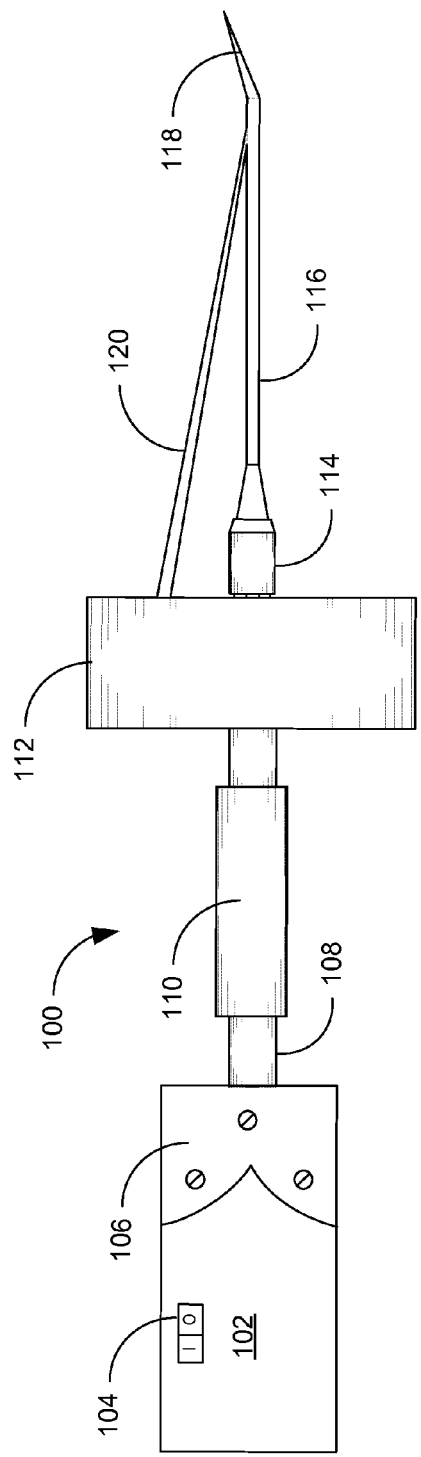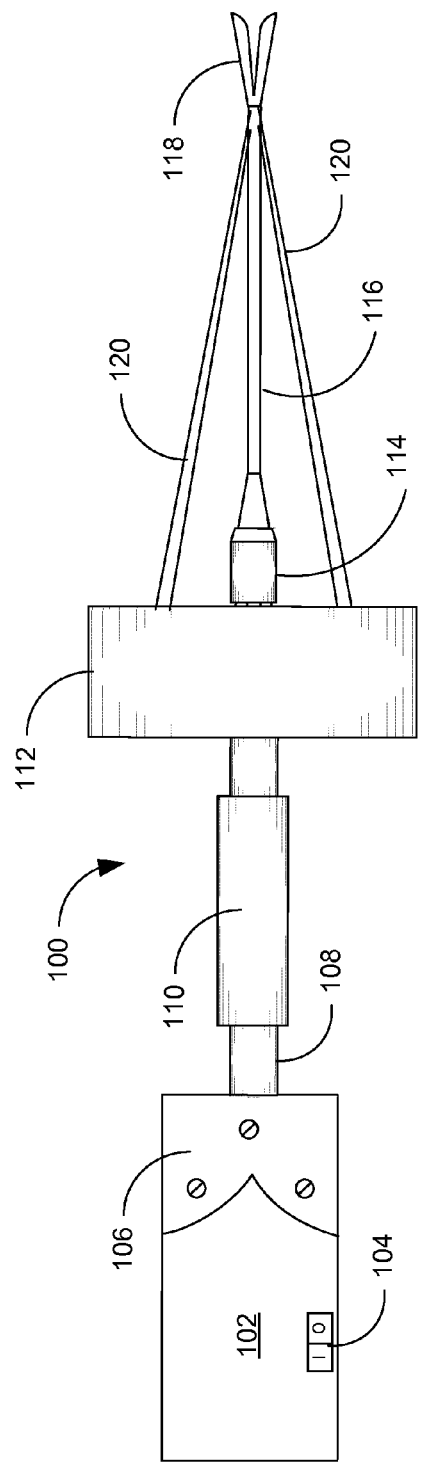

FASTENER AND MATERIAL REMOVER

TECHNICAL FIELD OF THE INVENTION

The present disclosure relates generally to the field of removal of fasteners and surface materials, and particularly to an apparatus for efficiently removing fasteners and surface materials using a reciprocating mechanism.

BACKGROUND OF THE INVENTION

In the course of renovation and repair work, it is often necessary to remove old materials and fasteners before new materials can be applied. Removal of old materials and fasteners is known to be difficult and labor-intensive work. Thus, there is a need for effective tools for reducing the volume of human effort by expediting the process.

SUMMARY OF THE INVENTION

The present disclosure provides a versatile apparatus for removing fasteners in a convenient, easy and economical manner. The apparatus of the present disclosure provides a worker or work crew with the ability to remove fasteners and materials efficiently and without unnecessary effort.

More specifically, the present disclosure provides various embodiments of an apparatus for removing fasteners comprising a motor having a motor frame and an output shaft. According to one design disclosed herein, the apparatus includes a drive shaft operably connected to the output shaft of the motor. A striker retention frame is fixed to and disposed about the drive shaft, and an array of rolling strikers is disposed within the striker retention frame. An axially-translatable strike plate is disposed adjacent to the rolling strikers. An array of fixed strikers is disposed on the strike plate. A shear blade is operably connected to the strike plate, to receive reciprocating motion therefrom. With this design, rotary motion is converted into reciprocating motion whenever the two sets of strikers are brought into engagement with one another.

According to an alternate design, an apparatus for removing fasteners includes a motor, a flywheel driven by the motor, a rotating striker retention frame fixed to the flywheel and a second frame, disposed adjacent to the flywheel and axially-translatable with respect thereto. The apparatus further includes a first array of rotating strikers disposed in the rotating striker retention frame, an array of non-rotating strikers, disposed on the frame and a shear blade, operably connected to the frame. As described above, rotary motion is converted into reciprocating motion whenever the two sets of strikers are brought into engagement with one another.

Other features and advantages of the present disclosure will be apparent to those of ordinary skill in the art upon reference to the following detailed description taken in conjunction with the accompanying drawings.

BRIEF DESCRIPTION OF THE DRAWINGS

For a better understanding of the disclosure, and to show by way of example how the same may be carried into effect, reference is now made to the detailed description along with the accompanying figures in which corresponding numerals in the different figures refer to corresponding parts and in which:

FIG. 1 is a side view of a fastener removal apparatus in accordance with a first embodiment of the disclosure;

FIG. 2 is a top view of the fastener removal apparatus depicted in FIG. 1;

DETAILED DESCRIPTION OF THE INVENTION

Figure 3:
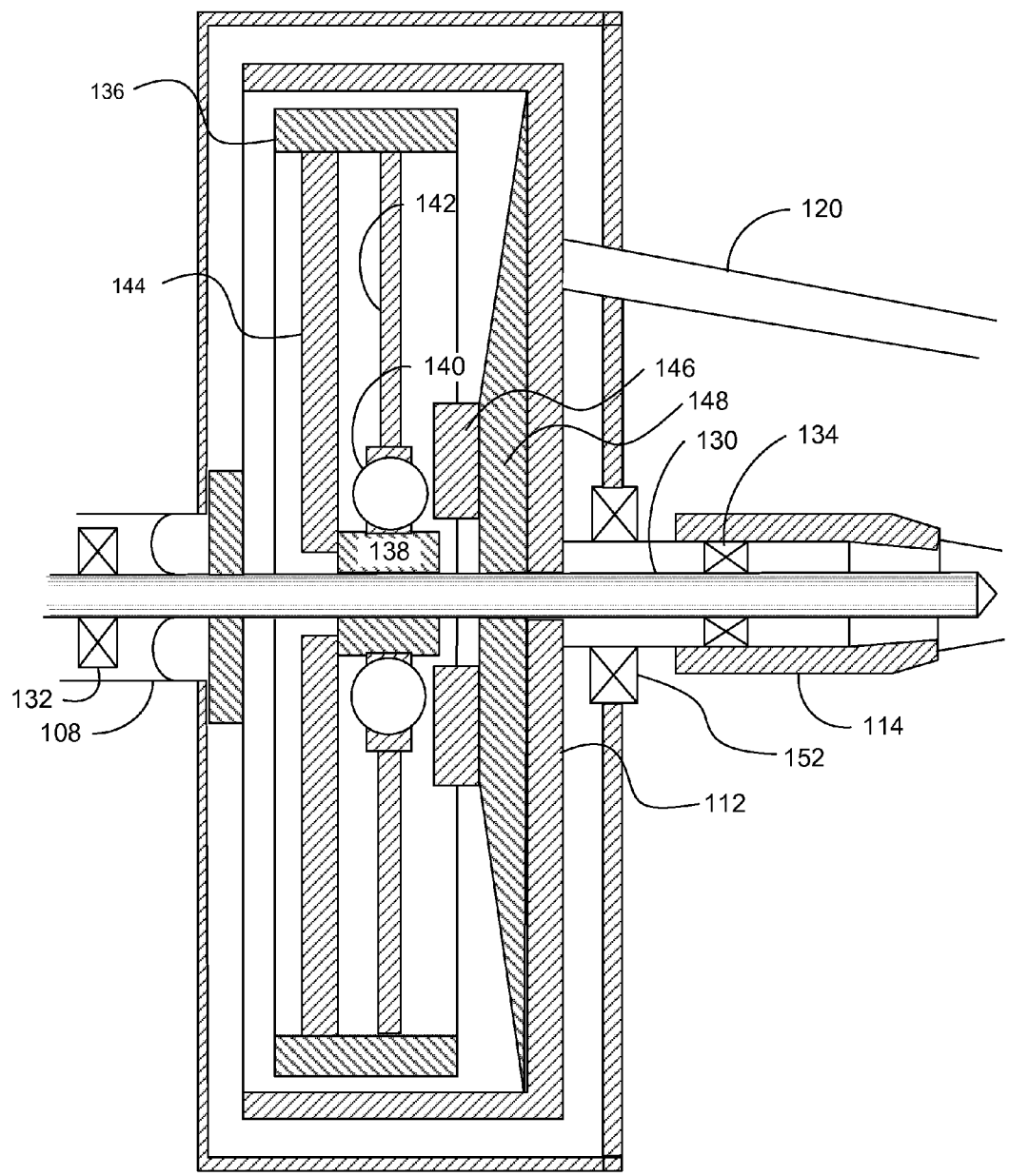
FIG. 3 is a side section view of the fastener removal apparatus shown in FIGS. 1 and 2.

While the making and using of various embodiments of the present disclosure are discussed in detail below, it should be appreciated that the present disclosure provides many applicable inventive concepts, which can be embodied in a wide variety of specific contexts. The disclosure is primarily described and illustrated hereinafter in conjunction with various embodiments of the presently-described fastener removal apparatus. The specific embodiments discussed herein are, however, merely illustrative of specific ways to make and use the disclosure and do not limit the scope of the disclosure.

Referring now to FIGS. 1 and 2, the present disclosure is described in greater detail in reference to one general embodiment of the fastener removal apparatus according to the present disclosure. FIG. 1 depicts a side view of a fastener removal apparatus in accordance with a first embodiment of the disclosure. FIG. 2 is a top view of the fastener removal apparatus depicted in FIG. 1. As seen in FIGS. 1 and 2, apparatus 100 comprises motor 102 having switch 104 and connected to handle 108 by bracket 106. Handle 108 has a grip 110 to facilitate secure engagement. Canister 112 is secured to handle 108 on one end and strike shaft 116 on the other via coupling 114. At the end of strike shaft 116 is a shear blade 118. Strike shaft 116 is supported by a set of braces 120.

FIG. 3 is a side section view of the fastener removal apparatus shown in FIGS. 1 and 2. As seen in FIG. 3, drive shaft 130 rides on bearings 132, 134. Drive shaft 130 is operably connected to moter 102 in such manner as to be rotatably driven and powered thereby. Flywheel 136 rides on drive shaft 130, secured thereto via flywheel hub 138. An array of rolling strikers 140 is connected to and driven by a striker retention frame 142, which may be incorporated into flywheel 136 or may be a separate structure, depending on the embodiment. An impeller 144 is disposed on one side of the flywheel 144, for cooling and distribution of lubrication.

In the embodiment shown in FIG. 3, striker retention frame 142 is designed to allow the rolling strikers 140 to rotate about one or more axes while retaining them in a particular arrangement to one another. Striker retention frame 142 is shaped and sized to retain a circular array of spherical strikers, but those of skill in the art will recognize that alternate embodiments may employ alternate striker designs and alternate striker retainers. Such striker designs may include cylindrical or conical strikers, as examples.

Rolling strikers 140 are disposed adjacent to an array of fixed strikers 146, which are secured to striker plate 148. Striker plate 148 is connected, in turn, to canister 112. Depending on the embodiment, flywheel 136, striker plate 148, or both, may be retained in such manner as to allow for axial movement between themselves and the surrounding components of apparatus 100. In the embodiment shown in FIG. 3, flywheel 136 may be axially secured to driveshaft 130, while striker plate 148 is free to translate axially along drive shaft 130, so as to allow the strikers 140, 146 to be engaged or disengaged with one another as necessary. In certain embodiments, it may be preferable that there be sufficient axial movement between flywheel 136 and striker plate 148 to allow for full disengagement between rolling strikers 140 and fixed strikers 146 at one end of travel and full engagement of strikers 140, 146 at the other.

As drive shaft 130 rotates the flywheel 136, rolling strikers 140 move past fixed strikers 146. So long as the plane defined by the proximate extremities of the rolling strikers 140 does not cross the plane defined by the proximate extremities of the fixed strikers 146, there will be no physical contact between rolling strikers 140 and fixed strikers 146.

Figure 4:
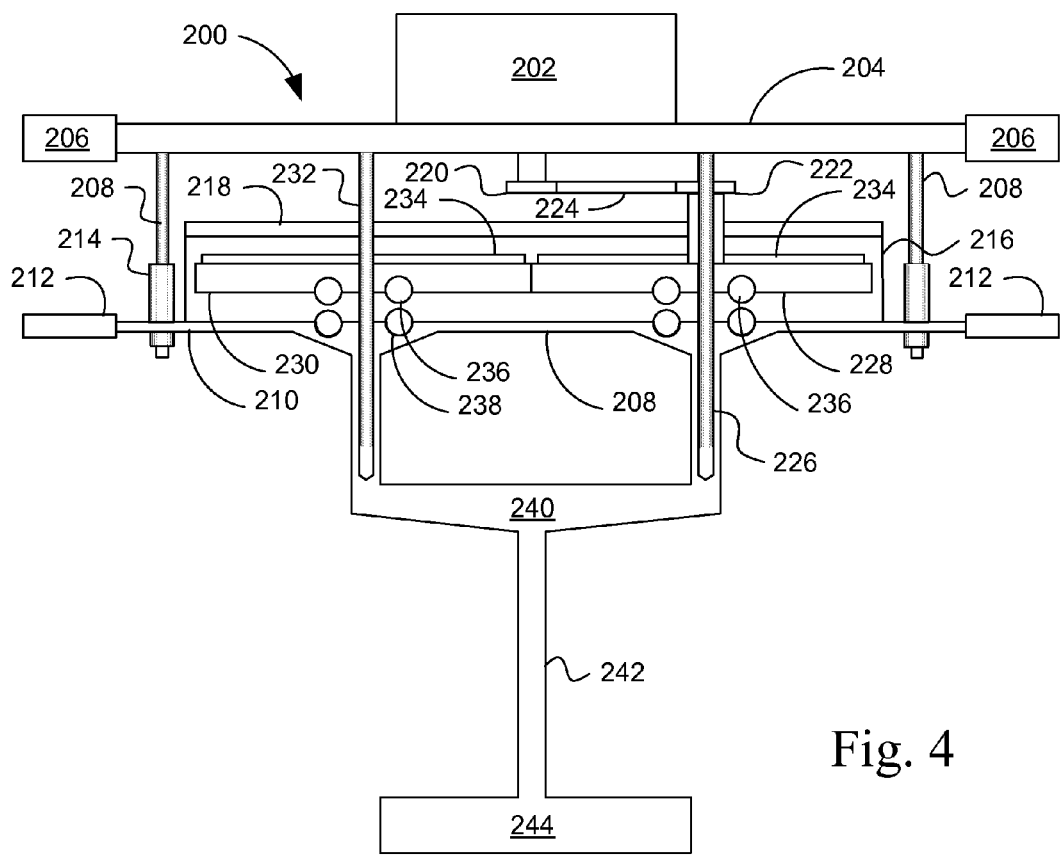
FIG. 4 is a top section view of a second embodiment of the fastener removal apparatus of the present invention.
Figure 5:
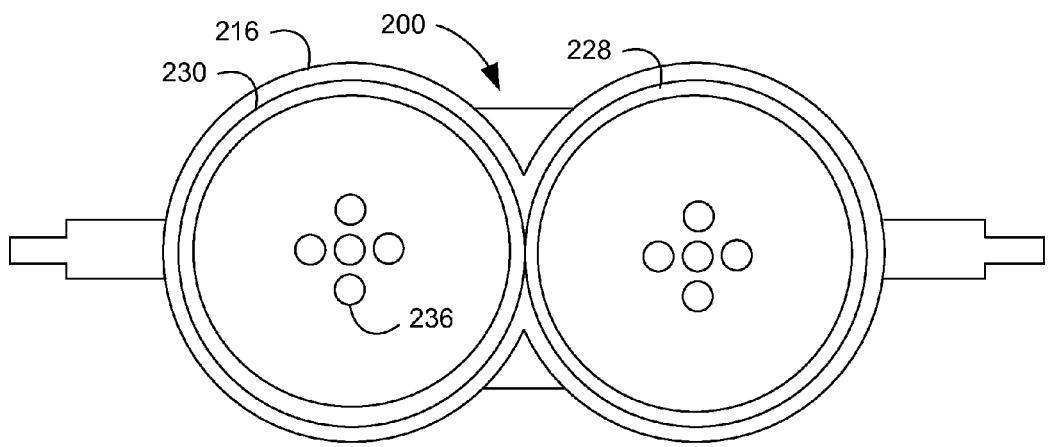
FIG. 5 is a front section view of the fastener removal apparatus of FIG. 4.

FIG. 4 is a top section view of a second embodiment of the fastener removal apparatus of the present invention. FIG. 5 is a front section view of the fastener removal apparatus of FIG. 4. Apparatus 200 comprises a motor 202 secured to an upper frame 204 having a pair of upper handholds 206. A pair of pilot pins 208 extend from the upper frame 204 to lower frame 210. A pair of retention springs 214 provide for movement between upper frame 206 and lower frame 210. A pair of lower handholds 212 are secured to lower frame 210. A lubrication retaining fence 216, having an air filter 218 secured thereto, is secured to lower frame 210.

A drive pulley 220, secured to the output shaft of motor 202, powers a driven pulley 222, disposed about internal pilot pin 226, via a drive belt 224. Driven pulley 222 is, in turn, secured to primary flywheel 228, which is also disposed about internal pilot pin 226. A secondary flywheel 230, disposed about internal pilot pin 232, engages with, and is driven by, primary flywheel 228. Flywheels 228, 230 have impellers 234 secured to their top sides in order to provide cooling and lubrication.

A set of rolling strikers 236 is disposed in each of flywheels 228 and 230. They are positioned to be engageable with a matching set of rolling strikers 238 disposed in lower frame 210. The operation of these strikers is similar to the operation of the strikers shown in FIG. 3 and described in connection therewith. The engagement of rolling strikers 236 with rolling strikers 238 imparts a reciprocating motion to lower frame 210 when the two sets of strikers are in contact.

In a similar manner to that described above in connection with FIGS. 1-3, the motion imparted to lower frame 210 by the engagement of strikers 236, 238 is imparted to yoke 240, and from there to strike shaft 242 and finally to splitting wedge 244.

Figure 7:
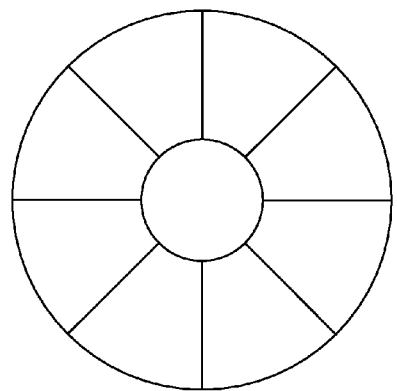
FIG. 7 is an end view of the fixed striker array of FIG. 6.
Figure 8:
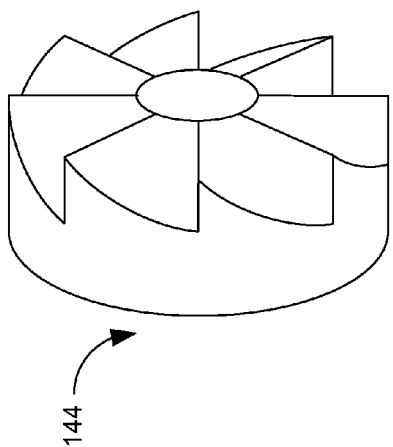
FIG. 8 is an oblique view of the fixed striker array of FIGS. 6 and 7.
Figure 6:
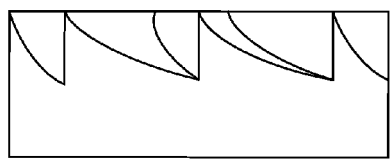
FIG. 6 is a side view of a fixed striker array.

FIGS. 6-8 depict various views of one embodiment of a fixed striker array suitable for use with any of the above-described embodiments. FIG. 6 is a side view of a fixed striker array. FIG. 7 is an end view of the fixed striker array of FIG. 6. FIG. 8 is an oblique view of the fixed striker array of FIGS. 6 and 7.

Similar embellishments, and various combinations thereof, are all comprehended by the present disclosure. In fact, all embodiments described herein are presented for purposes of illustration and explanation only. The specific compositions, configurations, orientations and operations of various features, portions and members may be provided in a number of ways in accordance with the present disclosure.

Thus, the embodiments and examples set forth herein are presented to best explain the present disclosure and its practical application and to thereby enable those skilled in the art to make and utilize the disclosure. As previously explained, those skilled in the art will recognize that the foregoing description and examples have been presented for the purpose of illustration and example only. The description as set forth is not intended to be exhaustive or to limit the disclosure to the precise form disclosed. Many modifications and variations are possible in light of the above teaching without departing from the spirit and scope of the following claims.

What is claimed is:

1. An apparatus for removing fasteners comprising:
a motor having a motor frame and an output shaft;
a drive shaft, operably connected to the output shaft of the motor;
a striker retention frame, fixed to and disposed about the drive shaft;
an array of rolling strikers disposed in the striker retention frame;
an axially-translatable strike plate, disposed adjacent to the rolling strikers;
an array of fixed strikers, disposed on the strike plate; and
a shear blade, operably connected to the strike plate.

2. The apparatus of claim 1, wherein the rolling strikers are generally-spherical.

3. The apparatus of claim 1, wherein the fixed strikers are wedge-shaped.

4. The apparatus of claim 1, wherein the rolling strikers are generally-cylindrical.

5. The apparatus of claim 1, wherein the fixed strikers have a sinusoidal pattern.

6. The apparatus of claim 1, wherein the rolling strikers are generally-conical.

7. The apparatus of claim 1, wherein the striker retention frame comprises an array of axles extending radially from the drive shaft.

8. An apparatus for removing fasteners comprising:
a motor;
a flywheel, driven by the motor;
a rotating striker retention frame, fixed to the flywheel;
a first array of rotating strikers disposed in the rotating striker retention frame;
a frame, disposed adjacent to the flywheel and axially-translatable with respect thereto;
an array of non-rotating strikers, disposed on the frame; and
a shear blade, operably connected to the frame.

9. The apparatus of claim 8, wherein the rotating strikers are generally-spherical.

10. The apparatus of claim 8, wherein the non-rotating strikers are wedge-shaped.

11. The apparatus of claim 8, wherein the rotating strikers are generally-cylindrical.

12. The apparatus of claim 8, wherein the non-rotating strikers have a sinusoidal pattern.

13. The apparatus of claim 8, wherein the rotating strikers are generally-conical.

14. The apparatus of claim 8, wherein the rotating striker retention frame comprises an array of axles extending radially from a hub of the flywheel.

* * * * *